Sept. 11, 1928.

J. O. BAILEY

ENDLESS SPIRAL CONVEYER

Filed April 26, 1927

1,684,254

Inventor
Joseph Oswell Bailey

By Ahnert, Crowe & Gordon

Attorneys

Patented Sept. 11, 1928.

1,684,254

UNITED STATES PATENT OFFICE.

JOSEPH OSWELL BAILEY, OF ATLANTA, GEORGIA.

ENDLESS SPIRAL CONVEYER.

Application filed April 26, 1927. Serial No. 186,791.

Generically this invention relates to conveyers, but it more especially comprehends the type known as endless spiral or screw conveyers.

One important object of this invention is the provision of a cold rolled, cold drawn, continuous helicoid flight spiral steel conveyer, formed with a thickened reenforcement or bead on its outer edge.

Another object of this invention is the provision of a continuous cold drawn steel helicoid conveyer having its outer edge terminating in a thickened portion or bead to resist wear, and its inner or supporting edge thickened to strengthen the flight, said flight being reversibly mounted on its supporting shaft.

A further important object of this invention is the provision of an endless cold rolled steel spiral conveyer constructed from one piece having its outer edge terminating in a thickened reenforcement or bead, said conveyer adapted to be driven in opposite directions, and reversible according to wear on its operating face, as desired.

Figure 1:
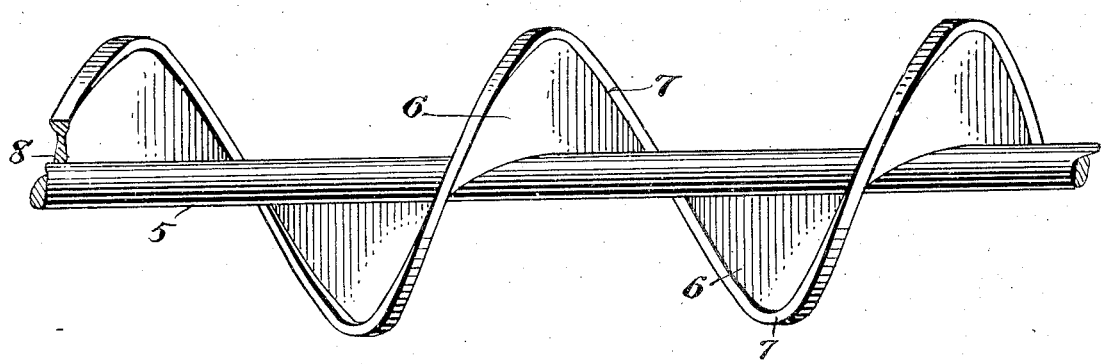
Figure 2:
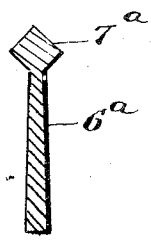
Figure 3:
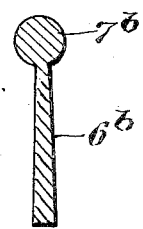
Figure 4:
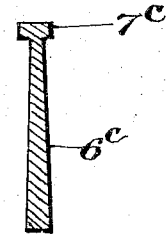
Figures 5, 6:

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Figure 1 is a side elevation of a longitudinal section of my conveyer and supporting shaft; and Figures 2, 3, 4, 5, and 6, are vertical sections of the spiral flight showing modifications illustrating beads of different types and configurations.

I am aware that there are various types of endless conveyers some of which employ riveted sections; others formed by rolling the metal while in a heated condition to form the spiral; others having a thin outer edge quickly susceptible to wear; and to overcome which objections still others present laminated outer edges which likewise become separated and distorted in usage; and it was to overcome the inherent deficiencies of all such types with which I am familiar that I evolved the endless steel spiral conveyer cold drawn, thereby preserving the qualities of the metal and forming in effect a slight case hardening of the surface in the process of forming, presenting no riveted heads or other perturbances to be subjected to undue wear, formed with a bead or thickened portion on its outer edge to not only be wear resistant but to strengthen the flight, said flight tapering from its periphery adjacent the bead toward its axis to form a thickened axial inner edge to strengthen the conveyer, so that the same will withstand heavy load stresses and present a balanced spiral capable of being run in either direction or of being reversed, that I designed the continuous steel spiral conveyer forming the subject matter of this invention.

In the illustrated embodiment characterizing this invention there is shown a solid or tubular shaft 5 having a helcoid disposed conveyer or blade member 6 securely mounted thereon. The helicoid or conveyer blade 6 is formed with a peripherical bead or thickened portion 7 on its outer edge, said blade being comparatively thin adjacent the inner edge of the bead and tapering outwardly to form a thickened inner or axial edge 8 and being inverted wedge shaped in cross section.

It is to be understood that the bead 7 may conform to a variety of configurations depending upon the usage of the particular conveyer, as will hereinafter more fully appear. It is at once evident that a helicoid conveyer blade substantially inverted wedge shaped in cross section and terminating in an integral bead as above described presents an evenly balanced conveyer flight susceptible of withstanding heavy load stresses, the bead not only strengthening the flight and presenting a reenforced surface at the point of greatest wear, but in motion also tending to effect movement of the material being propelled by said member radially from its periphery in the direction of its axis and the inclined face of the thickened inner edge tending to effect movement of the material radially away from its axis, which movements tend to prevent undue strain on the conveyer blade, by preventing jamming at some particular point, thereby aiding the propulsion of the material in conveying direction and lessening frictional wear on the operating surfaces of the blade.

Figures 2, 3, 4, 5, and 6, illustrate conveyer blades $6^a$, $6^b$, $6^c$, $6^d$, and $6^e$, conforming exactly to the blade 6 above described except presenting modified forms of beads $7^a$, $7^b$, $7^c$, $7^d$, and 7ᵉ, respectively. 6ᵈ represents a left hand conveyer and 6ᵉ a right hand conveyer. In some types of conveyers it is advantageous to have the bead formed only on one side as 6ᵈ and 6ᵉ, and also it is sometimes easier to form the conveyer by having the metal to flow during the forming process to one side only. As previously stated, depending upon the exigencies of the particular requirements, it may be advisable to accordingly change the configuration of the bead, and it is to be understood that I am nowise limited to the particular modifications shown as any configuration of bead formed in the manner above described comes within the scope of my invention.

From the above it will be apparent that I have designed an endless spiral or helicoid conveyer formed cold from a steel bar so constructed as to withstand heavy load stresses and to expeditiously convey heavy or light materials with a minimum of frictional wear on the conveyer, requiring a minimum of power, presenting reversible wearing surfaces, manufacturable at a minimum of cost and efficient for the purposes intended.

Although in practice I have found that the form of my invention illustrated in the accompanying drawings and referred to in the above description, as the preferred embodiment, is the most efficient and practical; yet realizing the conditions concurrent with the adoption of my invention will necessarily vary, I desire to emphasize that various minor changes in details of construction, proportion and arrangement of parts, may be resorted to within the scope of the appended claims without departing from or sacrificing any of the principles of this invention.

Having thus described my invention, what I desire protected by Letters Patent is as set forth in the following claims:

1. An endless conveyer comprising a shaft, a continuous spiral blade member helically mounted on and secured to the shaft, said blade having its inner and outer edges thickened.

2. An endless conveyer comprising a shaft, an endless spiral blade member helically mounted on the shaft, and a bead formed on the outermost edge of the blade, said blade radially increasing in thickness from the bead to its inner edge.

3. An endless conveyer comprising a shaft, a cold rolled continuous spiral blade member helically mounted on the shaft formed with a thickened inner edge, and having its outer edge terminating in a bead, said blade presenting a working surface on either side thereof.

4. An endless conveyer comprising a shaft, a cold formed endless spiral blade member helically arranged about the shaft, and having its inner edge thickened and a bead integrally formed on its outer edge projecting equi-distant on each side of the blade, said blade being reversible on said shaft.

JOSEPH OSWELL BAILEY.